(12) United States Patent
Tourunen et al.

(10) Patent No.: US 7,346,077 B2
(45) Date of Patent: Mar. 18, 2008

(54) PROCESSING OF ERRONEOUS DATA IN TELECOMMUNICATIONS SYSTEM PROVIDING PACKET-SWITCHED DATA TRANSFER

(75) Inventors: Ari Tourunen, Espoo (FI); Juha Kalliokulju, Vesilahti (FI)

(73) Assignee: Nokia Corporation, Espoo (FI)

( * ) Notice: Subject to any disclaimer, the term of this patent is extended or adjusted under 35 U.S.C. 154(b) by 1094 days.

(21) Appl. No.: 10/045,020

(22) Filed: Jan. 15, 2002

(65) Prior Publication Data

US 2002/0105971 A1    Aug. 8, 2002

(30) Foreign Application Priority Data

Jan. 16, 2001  (FI) ................... 20010098

(51) Int. Cl.
*H04J 3/16* (2006.01)
(52) U.S. Cl. ................. 370/469; 370/392; 370/474
(58) Field of Classification Search ........... 370/469, 370/392, 474
See application file for complete search history.

(56) References Cited

U.S. PATENT DOCUMENTS

| | | | |
|---|---|---|---|
| 6,266,350 B1 * | 7/2001 | Ojard et al. ............ 370/526 |
| 6,381,713 B1 * | 4/2002 | Irvin et al. ............ 714/701 |
| 6,687,670 B2 * | 2/2004 | Sydanmaa et al. ........ 704/226 |
| 6,738,634 B1 * | 5/2004 | Shin ..................... 455/466 |
| 6,967,964 B1 * | 11/2005 | Svanbro et al. .......... 370/437 |
| 2001/0007137 A1 | 7/2001 | Suumaki et al. |
| 2002/0015405 A1 | 2/2002 | Sepponen et al. |

FOREIGN PATENT DOCUMENTS

| | | |
|---|---|---|
| EP | 1 162 809 | 12/2001 |
| JP | 2002-544711 | 12/2002 |
| WO | WO/99/52307 | 10/1999 |
| WO | WO 00/69105 | 11/2000 |
| WO | WO 00/76112 | 12/2000 |

* cited by examiner

*Primary Examiner*—Huy D. Vu
*Assistant Examiner*—Jason Mattis
(74) *Attorney, Agent, or Firm*—Pillsbury Winthrop Shaw Pittman LLP (57) ABSTRACT

A method for arranging error control of packet-switched data, in which method at least a first part and a second part can be separated from the packets. In the method, errors detected in received data are checked, and conditions are determined for handling errors detected at least in the first and the second part. If an error is detected in a received first part and/or second part, the routine checks whether the conditions allow the first part and/or second part to be transmitted to upper protocol layers. If this is allowed, the first part and/or second part are transmitted to upper protocol layers.

19 Claims, 4 Drawing Sheets

PROCESSING OF ERRONEOUS DATA IN TELECOMMUNICATIONS SYSTEM PROVIDING PACKET-SWITCHED DATA TRANSFER

BACKGROUND OF THE INVENTION

The invention relates to the arranging of data error check and to the processing of erroneous data, particularly in the transmission of IP (Internet Protocol) packets.

Rapidly advancing IP technology has expanded the field of use of diverse IP-based applications beyond the conventional Internet data transfer. IP-based telephone applications in particular have developed rapidly, due to which an ever-increasing portion of the transfer path of the calls can be implemented using IP technology. Mobile communications networks in particular form an area where IP technology is anticipated to provide a host of advantages, because in addition to conventional speech services, which could be provided using different IP-based voice applications, mobile communications networks will be increasingly offering diverse data services, such as browsing of the Internet and electronic mail services, which are typically most advantageously produced as packet-switched IP-based services. Hence, IP-layers adapted to the protocols of the mobile communications system could be used for providing both audio/video services and various data services.

The IP layer is not guaranteed to provide error-free transfer on the network layer, but transfer reliability is achieved on the higher TCP (Transport Control Protocol) layer. TCP is responsible for acknowledging the packets and re-transmitting them. However, TCP does not meet the requirements of real-time applications where delay is critical. Real-time applications typically employ UDP (a User Datagram Protocol) for transferring audio and video data. Although UDP does not cause any additional delay because of re-transmissions and acknowledgements, it does not provide a reliable connection either. The audio/video flows to be carried over a packet-switched network are formed into packets and synchronized by RTP (a Real-time Transport Protocol) using UDP. Diverse error-check methods have been devised for the physical layer, particularly for data to be transferred over the radio interface. An error check method that is often used is CRC (Cyclic Redundancy Check), which allows transmission errors of a specific type to be detected.

In this application, the term 'payload' is used for data which is substantially useful for the application employed and 'header fields' for fields added into the payload by lower layers taking care of the data transfer of the application. In voice applications, the payload comprises for example voice samples and control data, the header fields on the network layer being for example RTP, UDP and IP header fields. The needs of the payload of the data to be transferred differ from those of the header fields, particularly as regards error tolerance. An error in the header fields would usually mean that the packet could not be transmitted to the correct recipient, although it might still be useful in the decompressing of the header fields. On the other hand, if the error were in the payload, the packet would probably be useful for a real-time application for generating an image or speech. However, erroneous data packets are typically discarded although they might be useful.

BRIEF DESCRIPTION OF THE INVENTION

It is therefore an object of the invention to provide a method and equipment implementing the method to allow the above-mentioned problems to be avoided. The objects of the method are achieved with a method, packet radio system, a mobile station and a network element characterized by what is stated in the independent claims. The preferred embodiments of the invention are disclosed in the dependent claims.

The underlying idea of the invention is that at least two parts can be separated from the packets, a first part and a second part, and that conditions are determined for handling them in an error situation. On the basis of the conditions, it may be possible to transmit the first and/or second part of a packet to upper layers.

An advantage of the solution of the invention is that, depending on the location of the error, the packets, or their parts, may be handled differently. This allows also erroneous packets to be transmitted, entirely or partly, to upper layers when so specified in the conditions.

According to a preferred embodiment of the invention, the first part comprises header fields and the second part payload. This allows most versatile conditions to be formulated for handling a packet containing erroneous payload and/or header fields. Further, it is possible to use even erroneous payload in the application or erroneous header fields in their decompression.

According to a preferred embodiment of the invention, the first part of the IP packets is transmitted on different logical connections than the second part. This allows to easily detect whether the error is in the first or the second part. 'Logical connection' refers to the connection provided by a data link layer L2 for the transfer of data between a mobile station and a packet radio network.

According to a further embodiment of the invention, the instructions are determined by means of radio resource control layer signalling from the packet radio network to the mobile station. An advantage of this is that it allows the network to determine how the mobile station is to handle the packets and thereby to know the level of the quality of the data transfer service to be provided more precisely than before.

BRIEF DESCRIPTION OF THE DRAWINGS

In the following the invention will be described in greater detail in connection with preferred embodiments and with reference to the accompanying drawings, in which.

DETAILED DESCRIPTION OF THE INVENTION

In the following, the method of the invention will be described by way of example with reference to UMTS (Universal Mobile Communications System) and transfer of IP packets. However, the invention is not restricted to the transfer of IP data, but can be applied in any packet-switched telecommunications system. The method of the invention can be advantageously applied for example in the projects for the further improvement of what are known as second generation mobile communications systems, such as the GERAN (GSM/Edge Radio Access Network).

Figure 1:
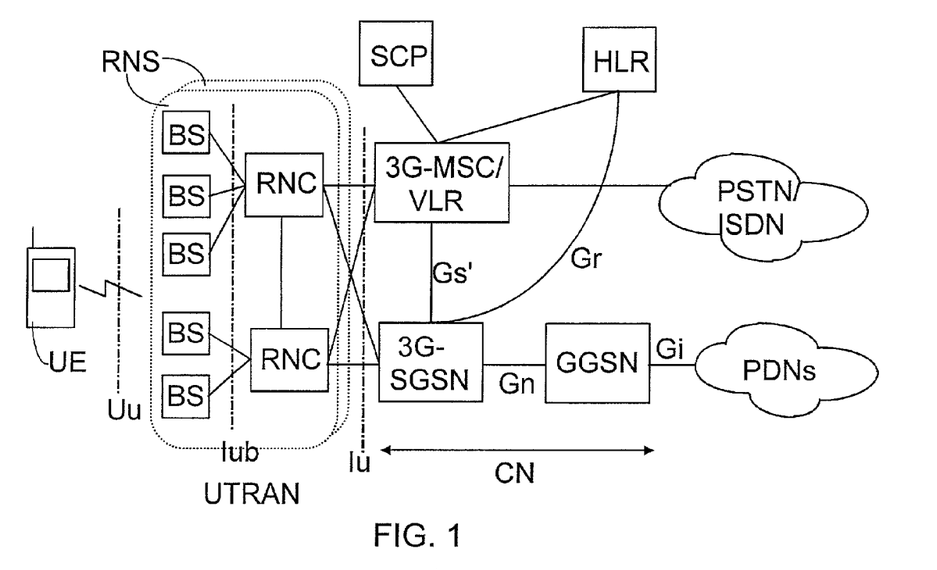
FIG. 1 is a block diagram illustrating a schematic view of the structure of UMTS.

FIG. 1 comprises only the UMTS system blocks that are essential for describing the invention, but a person skilled in the art will find it apparent that a conventional mobile communications system also comprises other functions and elements which need not be described in detail herein. The main parts of the mobile communications system are a core network CN and UMTS Terrestrial Radio Access Network UTRAN, which form the fixed network for the mobile communications system, and a mobile station or user equipment UE. The interface between CN and UTRAN is referred to as Iu and the air interface between UTRAN and UE as Uu.

UTRAN typically comprises a plurality of Radio Network Subsystems RNS, the interface between the subsystems being referred to as Iur (not shown). RNS comprises a Radio Network Controller RNC and one or more base stations BS, which are also referred to as node B. The interface between RNC and BS is referred to as Iub. A base station BS is typically responsible for the radio path implementation, the radio network controller RNC managing at least the following: radio resources management, control of inter-cell handover, power adjustment, timing and synchronization, paging of the user equipment.

The core network CN is made up of an infrastructure belonging to the mobile communications system and external to UTRAN. In the core network, a Mobile Switching Centre/Visitor Location Register 3G-MSC/VLR is connected to a Home Location Register HLR and preferably also to a Service Control Point SCP of an intelligent network. The home location register HLR and the visitor location register VLR comprise information on mobile subscribers: the home location register HLR comprises information on all subscribers in the mobile communications network and the services they subscribe to, and the visitor location register VLR comprises information on mobile stations visiting the area of a particular mobile switching centre MSC. A connection to a serving node of a packet radio system 3G-SGSN (Serving GPRS Support Node) is formed through interface Gs' and to a fixed telephone network PSTN/ISDN through a gateway mobile switching centre GMSC (Gateway MSC, not shown). The connection from both the mobile switching centre 3G-MSCNLR and the serving node 3G-SGSN to the radio network UTRAN (UMTS Terrestrial Radio Access Network) is set up through interface Iu. It should be noted that UMTS is designed such that the core network CN may be identical to the core network of GSM, for example, in which case there is no need to rebuild the entire network infrastructure.

UMTS thus also comprises a packet radio system which is to a large extent implemented according to a GPRS system connected to a GSM network, which explains the references to a GPRS system in the names of the network elements. The UMTS packet radio system may comprise a plural number of gateway and serving nodes, several serving nodes 3G-SGSN being typically connected to one gateway node 3G-GGSN. The serving node 3G-SGSN is responsible for detecting mobile stations capable of packet radio connections in its service area, for transmitting and receiving data packets from said mobile stations and for monitoring the location of the mobile stations in its service area. Further, the serving node 3G-SGSN is in contact with the home location register HLR through interface Gr. Data records related to the packet radio service and comprising subscriber-specific packet data protocol contents are also stored in the home location register HLR.

The gateway node 3G-GGSN acts as a gateway between the UMTS network packet radio system and the external data network PDN (Packet Data Network). External data networks include the UMTS or GPRS network of another network operator, the Internet, an X.25 network or a private local area network. The gateway node 3G-GGSN communicates with said data networks through interface Gi. Data packets transmitted between the gateway node 3G-GGSN and the serving node 3G-SGSN are always encapsulated according to the gateway tunneling protocol GTP. The gateway node 3G-GGSN also comprises the addresses of PDP (Packet Data Protocol) contexts activated for the mobile stations, and their routing information, i.e. 3G-SGSN addresses. The routing information is thus used to link the data packets between the external data network and the serving node 3G-SGSN. The network between the gateway node 3G-GGSN and the serving node 3G-SGSN employs an IP protocol, preferably the IPv6 (Internet Protocol, version 6).

Figure 2A:
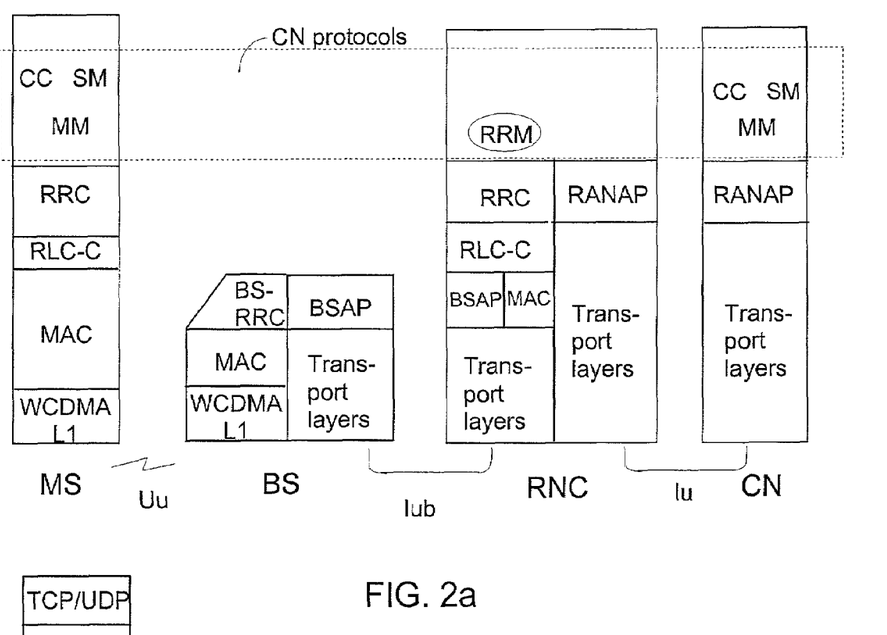
FIGS. 2a and 2b illustrate protocol stacks of an UMTS packet data service for control signalling and transmission of user data.
Figure 2B:
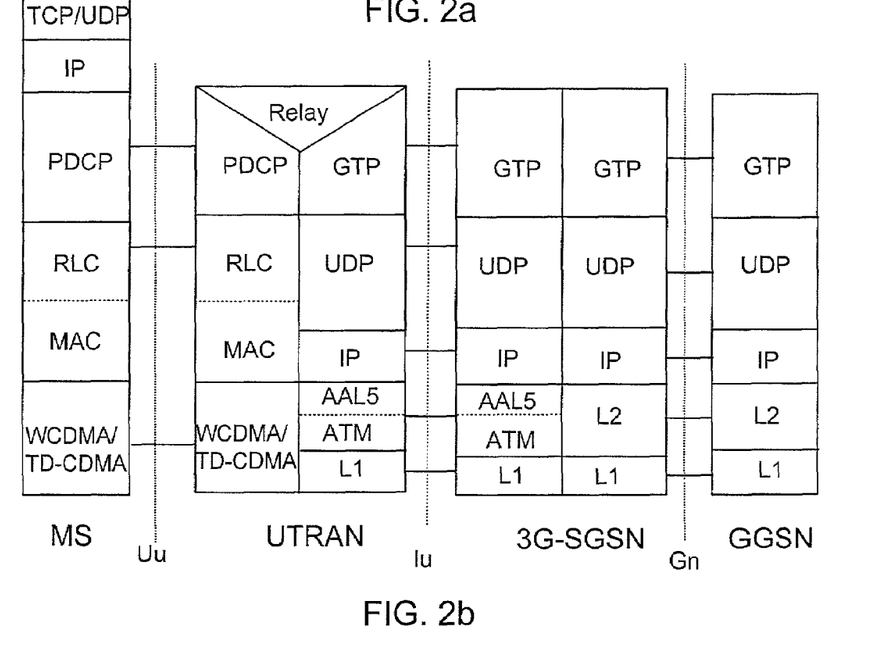

FIGS. 2a and 2b show UMTS protocol stacks used for control signalling (control plane) and transmission of user data (user plane) in the packet radio service provided by UMTS. FIG. 2a shows the protocol stack used for control signalling between the mobile station MS and the core network CN. Mobility management MM, call control CC and session management SM of the mobile station MS are signalled on the highest protocol layers between the mobile station MS and the core network CN in such a manner that the base stations BS and the radio network controller RNC located in between are transparent to this signalling. The radio resources management of radio links between mobile stations MS and base stations BS is carried out by a radio resource management system RRM which transmits control data from the radio network controller RNC to the base stations BS. These functions associated with the general management of a mobile system form a group called core network protocols (CN protocols), also known as Non-Access Stratum.

Correspondingly, the signalling related to the radio network control between the mobile station MS, the base station BS and the radio network controller RNC is carried out on protocol layers called radio access network protocols (RAN protocols), i.e. Access Stratum. These include transfer protocols of the lowest level, whose control signalling is transferred to the higher levels for further processing. The most essential one of the higher Access Stratum layers is the radio resource control protocol RRC which is responsible for example for establishing, configuring, maintaining and releasing radio links between the mobile station MS and the radio network UTRAN and for transmitting control information from the core network CN and the radio network RAN to the mobile stations MS. In addition, when a logical connection is to be established or configured, the radio resource control protocol RRC determines the parameters to be used on lower levels 1 and 2 according to the instructions of the radio resources management RRM.

UMTS packet-switched user data is transmitted using a protocol stack shown in FIG. 2b. On interface Uu between the radio network UTRAN and the mobile station MS, lower-level data transmission on physical layer L1 is performed according to a WCDMA or TD-CDMA protocol. A MAC layer above the physical layer transmits data packets between the physical layer and an RLC (Radio Link Control) layer, the RLC layer handling the management of the radio links of different logical connections. The RLC functions comprise for instance segmentation of the data to be transmitted into one or more RLC data packets. The header fields in data packets (PDCP-PDU) of the PDCP layer above RLC can optionally be compressed. The data packets are segmented and transmitted in RLC frames to which addressing and error detection information essential for data transmission is added. The RLC layer offers the PDCP layer the option of determining QoS (Quality of Service) and, in an acknowledging transmission (other forms of transmission being transparent and non-acknowledging transmissions), it also takes care of re-transmission of damaged frames, i.e. performs error correction. PDCP, RLC and MAC form the data link layer. The serving node 3G-SGSN is responsible for routing data packets coming from the mobile station MS through the radio network RAN further to the correct gateway node 3G-GGSN. This connection uses tunneling protocol GTP which encapsulates and tunnels all user data and signalling to be transmitted through the core network. The GTP protocol runs on top of the IP used by the core network.

A logical connection is typically allocated to a convergence entity providing transmission of the application layer data flow to the mobile communications network on one hand and to the convergence entity of RNC on the other, the logical connection being used for transferring IP packets to the physical layer. According to the standards of the third generation mobile communications system UMTS, the packet data protocol convergence (PDCP) layer entity always uses one radio link control (RLC) layer connection for transferring a data flow. When the RLC connection, and thereby the logical connection, is being allocated, parameters determining the characteristics of the logical connection, such as the quality of service level of the connection, are selected according to the instructions of RRC.

According to the invention, at least a first part and a second part can be separated from the packets. Depending on the errors detected at reception, the parts can be processed differently. According to a preferred embodiment of the invention, the first part comprises header fields and the second part payload, which allows erroneous payload or erroneous header fields to be also utilized, when necessary. In the embodiments described below, the division is based specifically on payload and header fields, although the scope of the invention is not restricted thereto. There are also other ways of making the division, for example payload bits having different significance may form parts that are processed differently.

Figure 3:
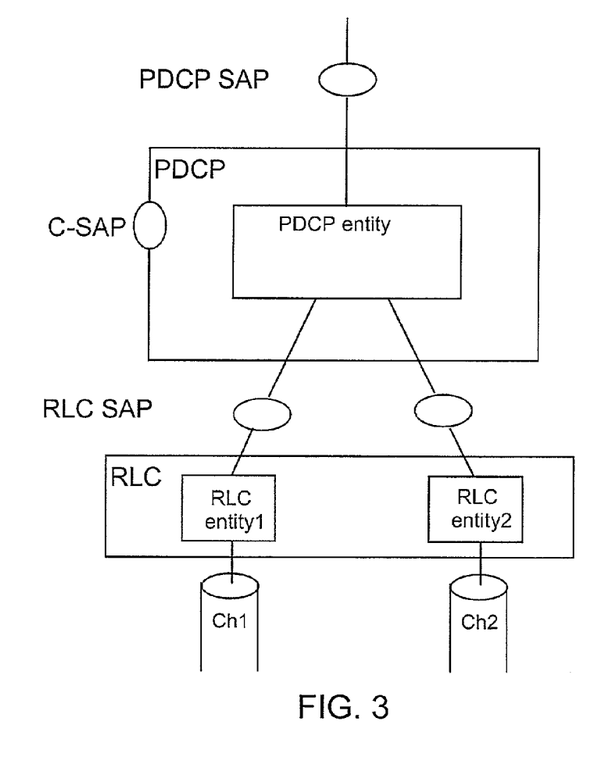
FIG. 3 illustrates RLC and PDCP layers in a system according to a preferred embodiment of the invention.

FIG. 3 illustrates RLC and PDCP layers in a system according to a preferred embodiment of the invention in which separate logical connections are allocated for the payload and the header fields. For each PDP context, one PDCP entity is allocated. The sending PDCP and the receiving PDCP usually comprise a compressor-decompressor pair for compressing data packets to be transmitted and for decompressing received data packets. Each PDCP entity may use one or more header field compression algorithms, or it does not necessarily use any.

The PDCP entity may be mapped to a plural number of RLC entities, which allows a plural number of logical connections LC1-LC2 to be offered to one PDCP entity. Separate logical connections are preferably allocated at least for payload and header fields. Payload and header fields are separated from the IP packets to be transmitted, and after compression they are transmitted on their respective logical connections LC1-LC2. This allows the PDCP entity to use logical connections LC1-LC2 of different characteristics for the payload and the header fields. Moreover, PDCP can transmit the header fields, on the basis of their compression state, for example, using a plural number of different logical connections. Also payload can be transferred using a plural number of different logical connections.

Figure 4:
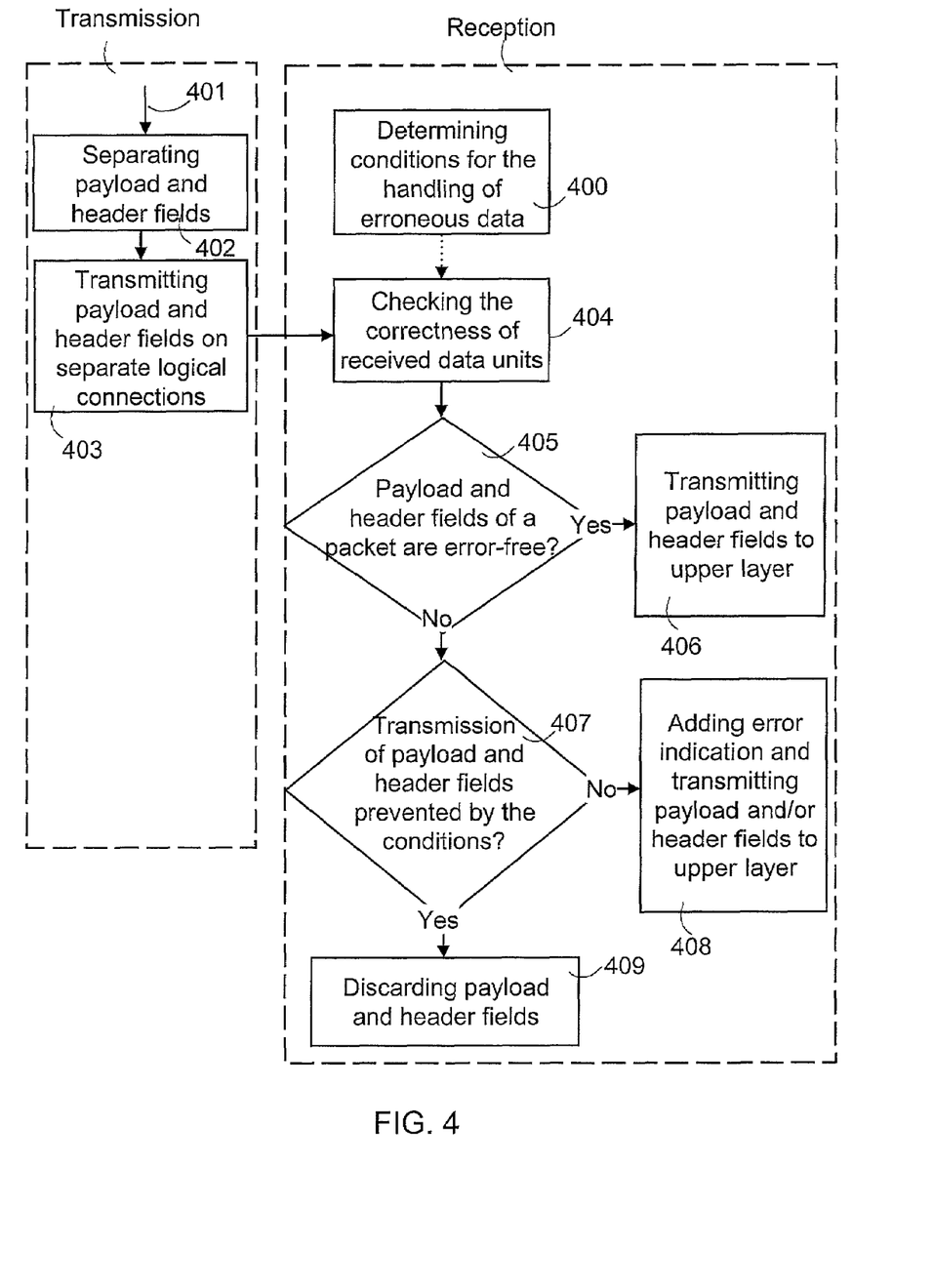
FIG. 4 is a flow diagram illustrating a method according to a preferred embodiment of the invention.

FIG. 4 illustrates a method according to a preferred embodiment of the invention in which different logical connections are used for monitoring errors in the transferred payload and header fields. The upper core network protocols activate a PDP context between the mobile station UE and the UMTS network. Logical connections are allocated for the payload and the header fields, the related parameters being determined between the RRC protocol entities. The parameters determined for the payload may be different from those of the header fields; for example, a more reliable connection may be allocated for the header fields.

For the handling of errors detected in the payload and the header fields, conditions are determined 400, preferably by means of RRC signalling, during the allocation of the logical connections. The conditions determine whether erroneous payload and/or header fields are transmitted to the upper protocol layers. Different conditions are listed below, although the scope of the invention is not restricted to them:

1. If there is an error in the header fields→no header fields or payload is transmitted to upper layers.
2. If there is an error in the header fields→the header fields are provided with an error indication and transmitted and the payload is transmitted.
3. If there is an error in the header fields→the header fields are provided with an error indication and transmitted, but the payload is not.
4. If there is an error in the payload→no header fields or payload are transmitted.
5. If there is an error in the payload→the header fields are transmitted, but the payload is not.
6. If there is an error in the payload→the header fields and payload are provided with an error indication and transmitted.
7. If there is an error in the header fields and the payload→no header fields or payload are transmitted.
8. If there is an error in the header fields and payload→the header fields are provided with an error indication and transmitted, but the payload is not.
9. If there is an error in the header fields and payload→the header fields and payload are provided with an error indication and transmitted.

Error indication may also be optional, which further increases the number of options. In other words, RRC signalling from RNC to mobile station UE can be used for signalling the conditions to be applied on a particular data link layer, the conditions being preferably a combination of the above conditions 1 to 9. According to the conditions provided, the RRC entity sets the parameters associated with the forwarding of the PDCP entity data and/or RLC entity data such that the conditions are met. This allows the network to influence the operation of the mobile station in handling the data. Another possible additional condition is that the transmission of payload and/or header fields to upper layers depends on the compression method applied, i.e. erroneous packets compressed using ROHC (Robust Header Compression), for example, are transmitted to upper layers, whereas packets compressed according to RFC2507 are not. The conditions may be further specified so that the decision about the transmission of a packet to upper layers is made on the basis of the success of the decompression. The conditions to be applied in each particular case may be dynamically determined, according to the needs of the application or the compression, for example. If necessary, the conditions may be changed during the logical connections by means of RRC signalling, due to changes in the characteristics of the service in use, for example, the changed conditions being then implemented by changing the parameters of the data link layer.

When there are IP packets to be transmitted 401, the header fields and payload of the packet to be transmitted are separated 402 in convergence entity PDCP. The header fields may be compressed using a predetermined compression algorithm, such as ROHC of IETF or an algorithm according to RFC2507, and the compression context. PDCP transmits 403 the payload and the header fields using the logical connections allocated for them.

At the reception of data, error check is carried out 404, 405 on the received data. The error check as such can be carried out using any method, for example CRC. Other, partly similar error check methods that may be used include the use of a checksum, parity check and a check based on convolution coding. Similarly as in UMTS, errors in a data unit may be detected already on the basis of CRC carried out on physical layer L1 and indicated to upper layers. The error indication may be arranged into the data units, or it may be transmitted to the data unit on a separate link. If there are no errors in the header fields and payload of one and the same IP packet, they can be transmitted 406 to upper layers. If there is an error in the payload or the header fields, the predetermined 400 conditions are checked. If allowed by the conditions, the payload and/or header fields are transmitted 408 to upper layers. The conditions may also prescribe that the header fields and payload are discarded 409. In other words, the conditions to be applied are determined according to whether the error is in the payload of one and the same packet, in its header fields or in both. For example, an error detected in a data unit comprising header fields may cause an error-free data unit comprising payload and belonging to the same IP packet to be discarded as well. As already stated, an error indication is added to the payload and the header fields before they are transmitted to upper layers. This allows also erroneous packets to be used in the decompression of the header fields or in a real-time application, for example. Even though the conditions would prevent the transmission of the header fields to upper layers (408 or 409), they can, however, be used in decompression. For this purpose, the conditions may be provided with a separate, additional condition; for example, condition 1 may prescribe that the header fields are not transmitted to the upper layers, but before they are discarded, they are used for decompression.

It is to be noted that, unlike in FIG. 3, the payload and the header fields may be separated 402 and transmitted on separate logical connections also on some other layer than PDCP. For example, the operation may be carried out by RLC, or on a new layer above or below PDCP. It is also possible that some of the payload is transmitted using the logical connections allocated for the header fields, or vice versa.

According to a first preferred embodiment of the invention, the PDCP layer is responsible for discarding erroneous data units and for transmitting them to the upper layers according to the predetermined conditions (400). In connection with the establishment of the PDCP entity, the RRC entity determines parameters for it to allow the predetermined conditions to be met. On the basis of an error indication in the data units of the logical connections provided by the RLC layer, PDCP thus detects erroneous data units comprising payload and those comprising header fields. When PDCP detects an error in the payload, for example, it performs an error check on the header field belonging to the same IP packet. When allowed by the conditions, the payload and the header fields are either partly or completely combined and the IP packet thus obtained is transmitted to upper layers. When necessary, the PDCP entity decompresses the received header fields according to the negotiated compression algorithm and the compression context. It should be noted that errors may be detected in the PDCP layer e.g. on the basis of a CRC check by ROHC.

According to a second embodiment of the invention, the RLC layer is responsible for discarding the data units or for transmitting them to upper layers according to the conditions (400) set by the RRC entity. Since the transfer of payload is carried out by different RLC entities than that of header fields, RRC can simply determine whether the RLC entities will transmit an erroneous data unit or not. If allowed by the conditions, the payload and/or header fields are transmitted to the PDCP layer. The header fields and payload are combined and transmitted as complete IP packets to higher levels. It is also possible that the conditions only prescribe the transmission of the header fields (conditions 3, 5 and 8) to the PDCP layer, whereby PDCP can then use them in decompression.

According to a third embodiment of the invention, both PDCP and RLC participate in the discarding or forwarding of erroneous packets. For example, the RLC entity which is responsible for the logical connection comprising payload is arranged to either discard or forward erroneous payload. However, PDCP may make the final decision about the transmission of the header fields and/or payload on the basis of three alternatives available for payload (already discarded on the RLC layer, error-free or erroneous) and the correctness of the header field.

Figure 5:
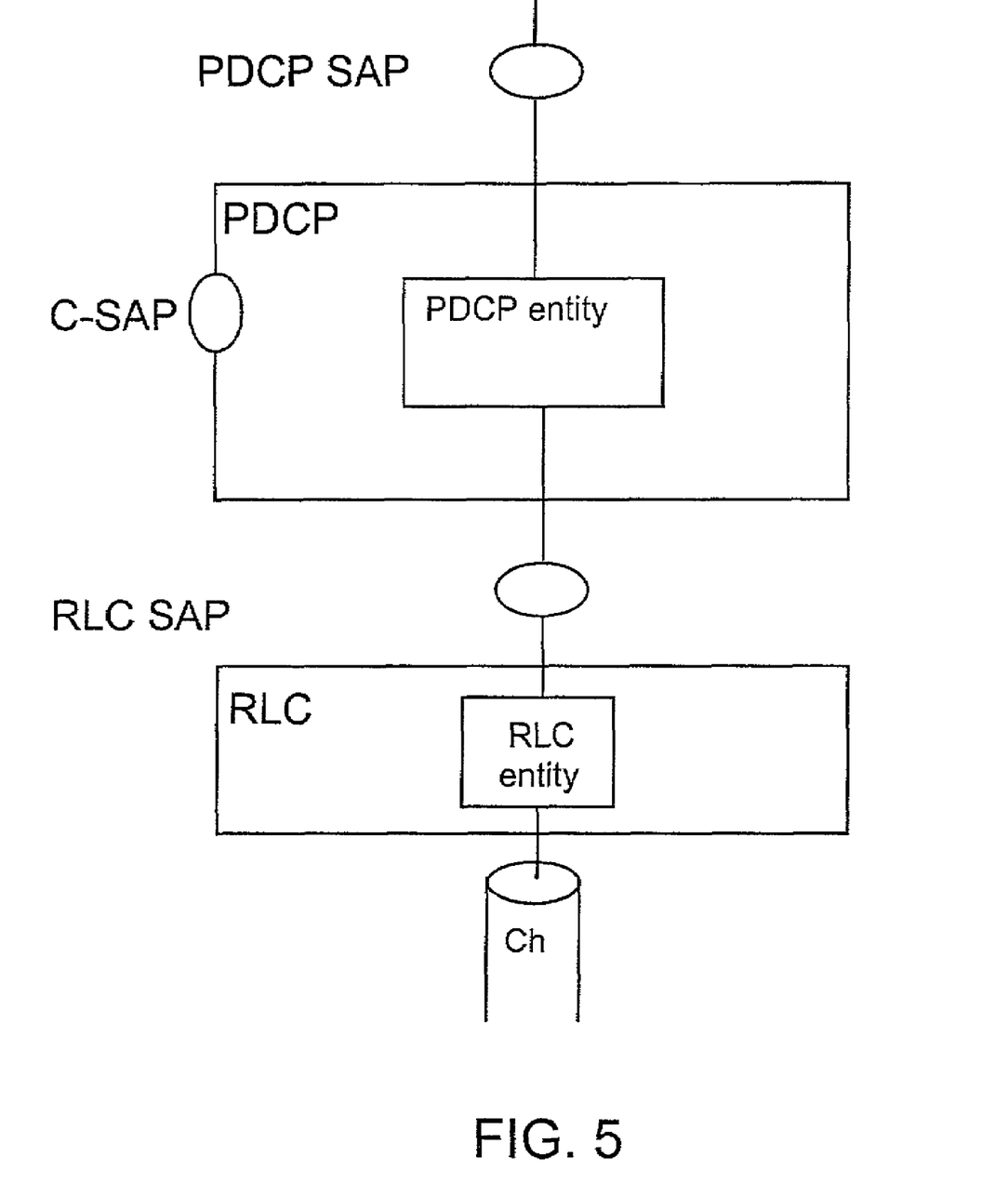
FIG. 5 illustrates RLC and PDPC layers in a system according to a preferred embodiment of the invention.

Unlike in FIG. 3, the invention may also be implemented so that there is only one RLC entity for each PDCP entity, this being shown in FIG. 5. The payload and the header fields are both transmitted using one logical connection, an error in the payload and/or the header fields being then localized in some other way than described above. The transmitting PDCP entity preferably indicates to the receiving PDCP entity the border between the payload and the header fields in the IP packets to be transmitted by using layers that may be even further below. It is also possible that the success of the decompression is used for distinguishing whether there is an error in the header fields and for deciding whether the packet concerned is to be transmitted to the upper layers. When an error is detected in the header fields and/or the payload, the conditions are checked and the process continues according to FIG. 4 (405-409). For example, if the decompression of a packet indicated as erroneous succeeds, the error is interpreted to have been in the payload and the packet is transmitted to upper layers.

According to a preferred embodiment of the invention, different conditions are determined for mobile stations than for the RNC providing the logical connections. In other words, RNC may apply different conditions than those it instructs to UE by means of RRC signalling. For example, the conditions may prescribe that at least the payload is to be transmitted to the upper layers in the mobile station even when there is an error in the header field. On the other hand, the conditions of RNC may require the entire packet to be discarded if there is an error in the header field. This allows attention to be focused on the transmission of the necessary packets better than before, because an IP packet containing an erroneous header field is not worth sending to other networks, but, on the other hand, even an erroneous packet may be useful for the UE application.

The invention may be implemented by software in the mobile station MS and in the radio network controller RNC using their processors, memory and interfaces. Hardware solutions may be used as well.

It is apparent to a person skilled in the art that as technology advances, the basic idea of the invention can be implemented in various ways. For instance, the inventive concept may be utilized in any header compression method in which a first part and a second part can be separated from the packets. One example of such header compression method is the ROHC. The invention and its embodiments are therefore not restricted to the above-described examples but they may vary within the scope of the claims.

The invention claimed is:

1. A method for arranging error control of packet-switched data, the method comprising:
   selecting during connection set-up conditions that apply for processing of a first part and a second part of a packet in an error situation;
   receiving the first part and the second part on separate logical connections;
   detecting errors in received data;
   checking, in response to an error detected in a received first part and/or second part whether said conditions allow the first part or second part to be transmitted to upper protocol layers; and
   transmitting, in response to said conditions allowing it, only the first part or the second part to the upper protocol layers,
   wherein the first part comprises header fields and the second part comprises payload, wherein the header fields are used for decompression, even if said conditions prevented their transmission to the upper protocol layers.

2. A method according to claim 1, further comprising:
   indicating to the upper layers an error detected in the first part and/or second part of the packets to be transmitted.

3. A method according to claim 1, wherein the error detection is performed on data units received on a physical layer and comprising the first part and the second part;
   an error indication is added to erroneous data units; and
   it is checked whether said data units meet said conditions.

4. A method according to claim 1, wherein a radio resource control protocol RRC is used for the management of radio resources, wherein
   said conditions are determined by means of RRC signaling between a packet radio network and a mobile station; and
   a data link layer entity is configured to carry out said check.

5. A method according to claim 1, wherein the logical connections are handled by RLC entity of a radio link control layer; and
   the RLC entities are provided with a command instructing whether an erroneous data unit is to be transmitted to an upper layer or not.

6. A method according to claim 1, wherein a PDCP entity of a packet data convergence protocol layer is responsible for separating the first part and the second part and for combining them; and
   said conditions are checked in the PDCP entity, in response to an indication that the first part and/or the second part in one and the same packet are erroneous.

7. A method according to claim 1, wherein different conditions apply for a mobile station than for a network element providing logical connections.

8. A packet radio system for transferring packet-switched data wherein
   the packet radio system is configured to select, during connection set-up, conditions for handling of errors detected at least in first parts and second parts of packets;
   the packet radio system is configured to receive the first part and the second part on separate logical connections;
   the packet radio system is configured to detect errors in received packet-switched data,
   the packet radio system is configured to check, in response to a detected error in the received first part and/or second part whether said conditions allow the first part or second part to be transferred to upper layers; and
   the packet radio system is configured to transmit, in response to said conditions allowing the transmission, only the first part or the second part to upper protocol layers,
   wherein each of the first parts comprise header fields, wherein the packet radio system is configured to use header fields for decompression, even if said conditions prevented their transmission to the upper layers.

9. A packet radio system according to claim 8, wherein the second part comprises payload.

10. packet radio system according to claim 8, wherein a radio resources control protocol RRC is used for the management of radio resources,
    the packet radio network of the packet radio system is configured to determine said conditions by means of RRC signaling to the mobile station; and
    "the mobile station and the packet radio network are configured to command a data link" layer entity to carry out said check.

11. A mobile station comprising:
    means for transferring packet-switched data;
    means for selecting, during connection set-up, conditions that apply for processing of a first part and a second part of a packet in an error situation;
    means for receiving a first part and a second part of a packet on separate logical connections;
    means for detecting errors in received data;
    means for checking, in response to an error detected in the received first part and/or second part whether said conditions allow only the first part or second part to be transmitted to upper protocol layers; and
    means for transmitting, in response to said conditions allowing it, the first part or the second part to the upper protocol layers, wherein the first part comprises header fields and the second part comprises payload,
    "wherein the mobile station is configured to use header fields for decompression, even if said" conditions prevented their transmission to the upper protocol layers.

12. A network element comprising:
    means for transferring packet-switched data;
    means for selecting, during connection set-up, conditions that apply for processing of a first part and a second part of a packet in an error situation;
    means for receiving a first part and a second part of a packet on separate logical connections;
    means for detecting errors in received data;
    means for checking, in response to an error detected in the received first part and/or second part, whether said conditions allow the first part or second part to be transmitted to upper protocol layers; and means for transmitting, in response to said conditions allowing it, only the first part or the second part to the upper protocol layers, wherein the first part comprises header fields and the second part comprises payload, wherein the network element is configured to use header fields for decompression, even if said conditions prevented their transmission to the upper protocol layers.

13. An apparatus configured to receive packet-switched data, wherein the apparatus is configured to select during connection set-up conditions that apply for processing of a first part and a second part of a packet in an error situation;

the apparatus is configured to receive a first part and a second part of a packet on separate logical connections;

the apparatus is configured to detect errors in received data;

the apparatus is configured to check, in response to an error detected in a received first part and/or second part whether said conditions allow only the first part or second part to be transmitted to upper protocol layers; and the apparatus is configured to transmit, in response to said conditions allowing it, the first part or the second part to the upper protocol layers, wherein the first part comprises header fields and the second part comprises payload, wherein the apparatus is configured to use header fields for decompression, even if said conditions prevented their transmission to upper layers.

14. An apparatus according to claim 13, wherein the apparatus is configured to indicate to the upper layers an error detected in the first part and/or second part of the packets.

15. An apparatus according to claim 13, wherein the error detection is performed on data units received on a physical layer and comprising the first part and the second part;

an error indication is added to erroneous data units; and it is checked whether said data units meet said conditions.

16. An apparatus according to claim 13, wherein the apparatus is configured to use a radio resource control protocol RRC for the management of radio resources, wherein the apparatus is configured to determine said conditions by means of RRC signaling between a packet radio network and the apparatus; and the apparatus is configured to provide a data link layer entity configured to carry out said check.

17. An apparatus according to claim 13, wherein the apparatus is configured to handle the logical connections by an RLC entity of the radio link control layer; and the apparatus is configured to provide the RLC entity with a command instructing whether an erroneous data unit is to be transmitted to an upper layer or not.

18. An apparatus according to claim 13, wherein the apparatus is configured to provide a PDCP entity of a packet data convergence protocol layer responsible for separating the first part and the second part and for combining them; and the PDCP entity is configured to check said conditions in response to an indication that the first part and/or the second part in one and the same packet are erroneous.

19. An apparatus according to claim 13, wherein different conditions apply for a mobile station than for a network element providing logical connections.

* * * * *